US009905374B2

(12) United States Patent
Lie

(10) Patent No.: US 9,905,374 B2
(45) Date of Patent: Feb. 27, 2018

(54) ELECTRIC ENERGY STORAGE DEVICE

(71) Applicant: Woo Yong Lie, Los Angeles, CA (US)

(72) Inventor: Woo Yong Lie, Los Angeles, CA (US)

( * ) Notice: Subject to any disclaimer, the term of this patent is extended or adjusted under 35 U.S.C. 154(b) by 1062 days.

(21) Appl. No.: 13/891,018

(22) Filed: May 9, 2013

(65) Prior Publication Data

US 2014/0335416 A1 Nov. 13, 2014

(51) Int. Cl.

*H01G 11/36* (2013.01)
*H01M 12/00* (2006.01)
*H01G 11/26* (2013.01)
*H01M 10/36* (2010.01)

(52) U.S. Cl.

CPC ............. *H01G 11/36* (2013.01); *H01G 11/26* (2013.01); *H01M 10/36* (2013.01); *H01M 12/005* (2013.01); *Y02E 60/13* (2013.01)

(58) Field of Classification Search

CPC ........ H01G 11/36; H01G 11/26; H01G 11/28; H01G 11/30; H01M 10/36; H01M 12/005
See application file for complete search history.

(56) References Cited

U.S. PATENT DOCUMENTS 4,730,239 A * 3/1988 Currie .................... H01G 9/038 361/502
5,538,811 A * 7/1996 Kanbara ................ C08L 71/02 252/62.2
5,849,025 A * 12/1998 Owens .................. H01G 9/042 607/5
2003/0016532 A1* 1/2003 Reed ......................... F21S 9/02 362/198
2003/0044680 A1* 3/2003 Umemoto ............. H01G 9/025 429/213
2006/0263687 A1* 11/2006 Leitner ................. H01G 9/038 429/217

OTHER PUBLICATIONS

Electronics Tutorials, Capacitors, Obtained Nov. 23, 2015, http://www.electronics-tutorials.ws/capacitor/cap_1.html.*

* cited by examiner

*Primary Examiner* — Jimmy K Vo
(74) *Attorney, Agent, or Firm* — John K. Park; Park Law Firm

(57) ABSTRACT

An electric energy storage device comprises first and second conductor layers, and positive and negative electrodes. The first conductor layer has both surfaces coated with ionic or dipole material across entire surface thereof. The second conductor layer has both surfaces coated with ionic or dipole material across entire surface thereof. The positive electrode is attached to the first conductor layer. The negative electrode is attached to the second conductor. The stored electrical energy is discharged and output to the electrodes by using an external AC voltage in a predetermined frequency range as a trigger power.

16 Claims, 8 Drawing Sheets

100
10
20
12
10
12
20
12
30
10
20
40

ELECTRIC ENERGY STORAGE DEVICE

BACKGROUND OF THE INVENTION

The present invention relates to an electric energy storage device. More particularly, this invention relates to an electric energy storage device, which has ultra high capacity.

Conventional energy storage devices are limited by many kinds of problems, and one of them is the energy storing capacity.

Accordingly, a need for an electric energy storage device has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide an electric energy storage device.

An electric energy storage device comprises a first conductor layer, a second conductor layer, a positive electrode, and a negative electrode.

The first conductor layer has both surfaces coated with ionic or dipole material across entire surface thereof.

The second conductor layer has both surfaces coated with ionic or dipole material across entire surface thereof.

The positive electrode is attached to the first conductor layer.

The negative electrode is attached to the second conductor.

The first conductor layer is stacked on top of the second conductor layer with a nanometer-scale interval therebetween so as to form a multilayer structure and at the same time a pseudo-quantum well heterostructure.

The first and second conductor layers form a bilayer configured to store electrical energy in the bilayer in a form of binding energy, wherein the electrical energy is stored in the first and second conductor layers by applying a DC voltage to the positive and negative electrodes.

The stored electrical energy is discharged and output to the first and second electrodes by using an external AC voltage in a predetermined frequency range as a trigger power.

Each of the first and second conductor layers may include activated carbons, graphenes, carbon nanotubes, or any kind of conducting materials that are nanometer-scale and suitable to get doped with an ionic material for a conductor layer, ionic polymers, and ionic minerals.

Each of the first and second conductor layers may be two-dimensional with a nanometer-scale thickness.

The first and second conductor layers may be stacked on top of each other so as to form a 2+1 dimension.

The ionic or dipole material coated on the first and second conductor layers may have a substantially zero electric charge transport property in a direction perpendicular to a plane of the first or second conductor layer so as to be an insulator in that direction.

A nanometer-sized bound state of charge may be induced and created by a charge separation and a longitudinal optical mode of dipolar phonon between the first and second conductor layers.

The electrical energy may be stored in an antiferroelectric nanostructure between the bilayers and the electronic charge double layer inside the conductor layer.

The frequency of the external AC field may be tuned with the dipole moments of the electrical energy storage device.

The antiferroelectric nanostructure may function as a micro-voltaic power source in discharging.

Each of the first and second conductor layers may be made from one selected from the group consisting of open structured activated carbon powder, carbon nano tube, and graphene.

Each of the first and second conductor layers may be made from high surface area activated carbon powder.

The ionic or dipole material may be selected from the group consisting of $MgSO_4$, $LiPF_6$, $LiClO_4$, $LiN(CF_3SO_2)_2$, $LiBF_4$, $LiCF_3SO_3$, $LiSbF_6$, $Li_4Ti_5O_{12}$. In a specific embodiment, the ionic or dipole material may be $MgSO_4$.

Each of the first and second conductor may be grown by a molecular beam epitaxy or metal-organic chemical vapor deposition.

The advantages of the present invention are: (1) the device has a ultra high capacity; and (2) the device can be manufactured easily.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
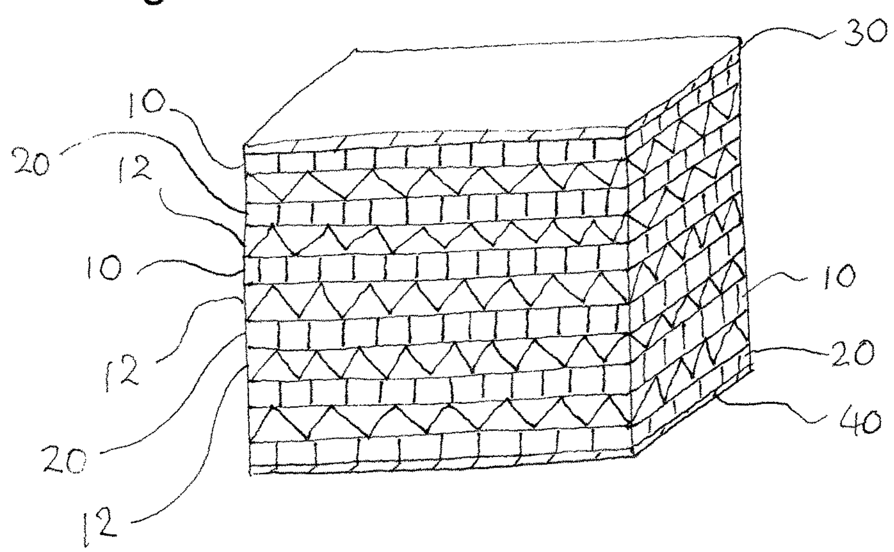
FIG. 1 is a perspective view of 2+1 dimensional battery cell multilayer structure according to an embodiment of the invention.
Figure 2:
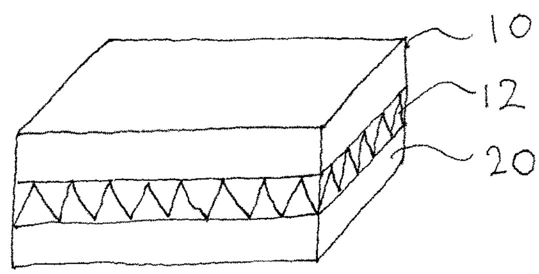
FIG. 2 is a perspective view showing a conductor bilayer according to an embodiment of the invention.
Figure 3:
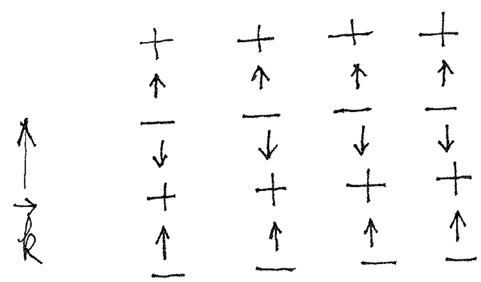
FIG. 3 is a schematic diagram showing a static longitudinal dipolar wave according to an embodiment of the invention.

FIGS. 1-6 show multilayer structures for an electric energy storage device according to the invention. FIGS. 7 and 8 are schematic circuit diagrams for charging and discharging of the electric energy storage device. FIGS. 9-12 show operations of the electric energy storage device.

An electric energy storage device 100 comprises a first conductor layer 10, a second conductor layer 20, a positive electrode 30, and a negative electrode 40.

The first conductor layer 10 has both surfaces coated with ionic or dipole material 12 across entire surface thereof.

The second conductor layer 20 has both surfaces coated with ionic or dipole material 12 across entire surface thereof.

The positive electrode 30 is attached to the first conductor layer 10.

The negative electrode 40 is attached to the second conductor 20.

The first conductor layer 10 is stacked on top of the second conductor layer 20 with a nanometer-scale interval therebetween so as to form a multilayer structure and at the same time a pseudo-quantum well heterostructure as shown in FIG. 1.

Figure 7:
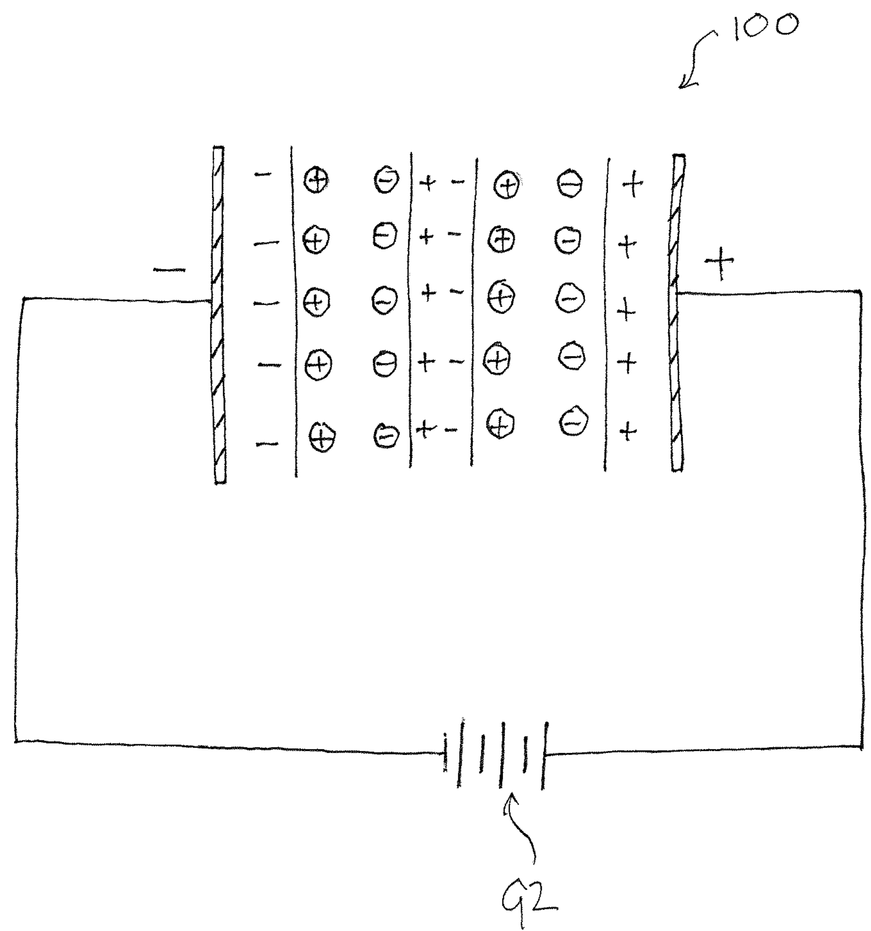
FIG. 7 is a schematic circuit diagram showing a charging process of an electric energy storage device according to an embodiment of the invention.
Figure 8:
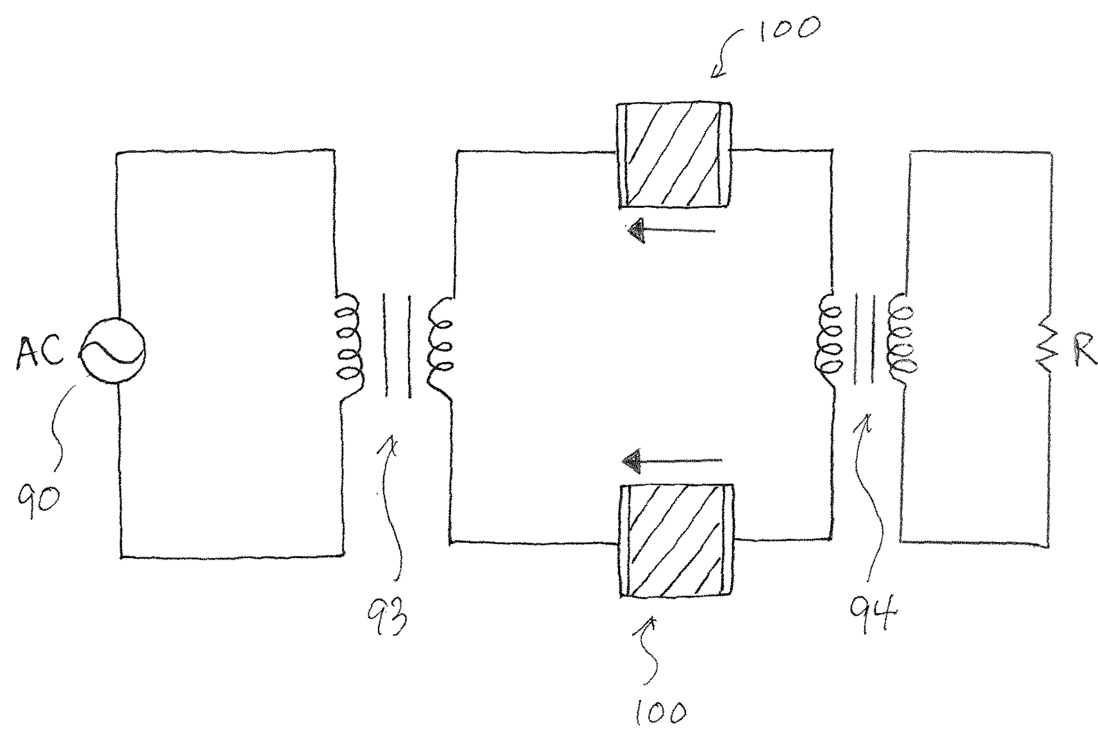
FIG. 8 is a schematic circuit diagram showing a discharging process of an electric energy storage device according to an embodiment of the invention.

The first and second conductor layers 10, 20 form a bilayer configured to store electrical energy in the bilayer in a form of binding energy, and the electrical energy is stored in the first and second conductor layers 10, 20 and between the bilayer by applying a DC voltage 92 to the positive and negative electrodes 30, 40 as shown in FIGS. 7 and 8.

The stored electrical energy is discharged and output to the first and second electrodes 30, 40 by using an external AC voltage 90 in a predetermined frequency range as a trigger power as shown in FIG. 8. The external AC voltage 90 may go through a transformer 93, and the output from the external AC voltage 90 may go through a transformer 94 as shown in FIG. 8. The arrows across the storage device 100 shows the ionic dipole direction. The directions of voltaic voltage of two cells are opposite to each other in the discharging process.

In the illustrated embodiment of FIG. 8, the output current through the resistor R has been reduced approximately from 1 A to about 0 A in the discharging process.

Each of the first and second conductor layers 10, 20 may include activated carbons, graphenes, carbon nanotubes, or any kind of conducting materials that are nanometer-scale and suitable to get doped with an ionic material for a conductor layer, ionic polymers, and ionic minerals.

Each of the first and second conductor layers 10, 20 may be two-dimensional with a nanometer-scale thickness.

The first and second conductor layers 10, 20 may be stacked on top of each other so as to form a 2+1 dimension.

The ionic or dipole material 12 coated on the first and second conductor layers 10, 20 may have a substantially zero electric charge transport property in a direction perpendicular to a plane of the first or second conductor layer 10, 20 so as to be an insulator in that direction.

A nanometer-sized bound state of charge may be induced and created by a charge separation and a longitudinal optical mode of dipolar phonon between the first and second conductor layers 10, 20 and the bound states of electrons and holes are due to bipolaronic interaction and Coulomb force as shown in FIGS. 3-6.

Figure 4:
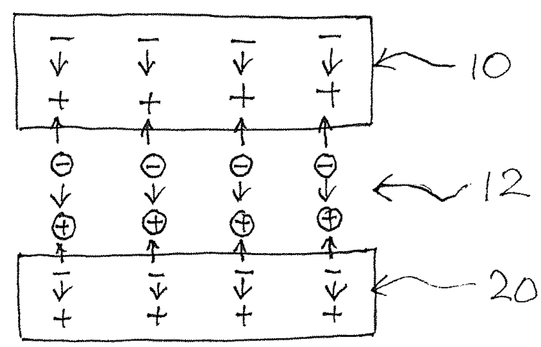
FIG. 4 is a schematic diagram showing a charge double layers according to an embodiment of the invention.
Figure 5:
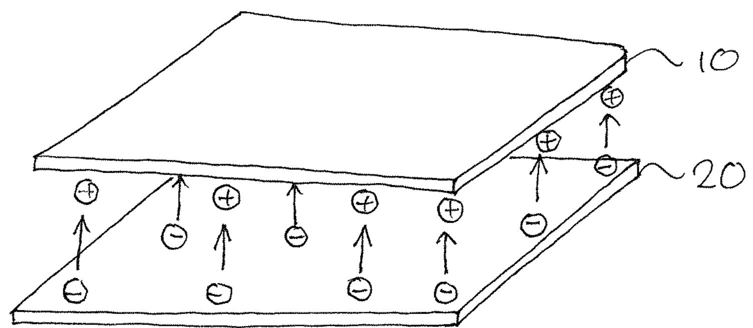
FIG. 5 is a schematic diagram showing a ferroelectric array of ionic dipoles according to an embodiment of the invention.
Figure 6:
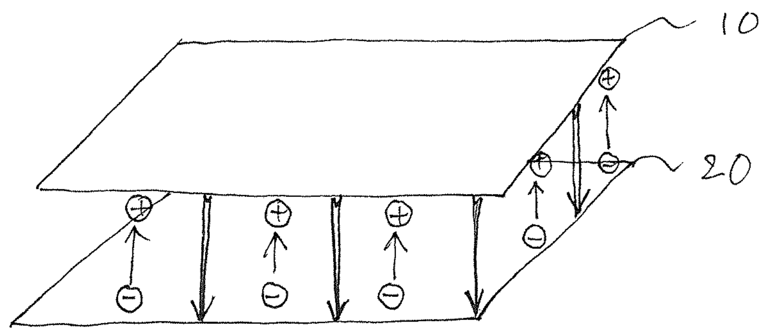
FIG. 6 is a schematic diagram showing an antiferroelectric array according to an embodiment of the invention.

The electrical energy may be stored in an antiferroelectric nanostructure between the bilayers 10, 20 and the electronic charge double layer inside the conductor layers 10, 20 as shown in FIGS. 4, 6, and 7.

The frequency of the external AC field may be tuned with the dipole moments of the electrical energy storage device 100 for discharging, and the electrical energy is stored inside the electric energy storage device 100 in three dimensional volume.

The antiferroelectric nanostructure may function as a micro-voltaic power source in discharging. A neutrality of the nanostructure helps a charging process, and the output voltage is a sum of the micro-voltages.

Each of the first and second conductor layers 10, 20 may be made from one selected from the group consisting of open structured activated carbon powder, carbon nano tube, and graphene.

Each of the first and second conductor layers 10, 20 may be made from high surface area activated carbon powder.

The ionic or dipole material 12 may be selected from the group consisting of MgSO4, LiPF6, LiClO4, LiN(CF3SO2)2, LiBF4, LiCF3SO3, LiSbF6, Li4Ti5O12. In a specific embodiment, the ionic or dipole material 12 may be MgSO4.

Each of the first and second conductor 10, 20 may be grown by a molecular beam epitaxy or metal-organic chemical vapor deposition.

Figure 9:
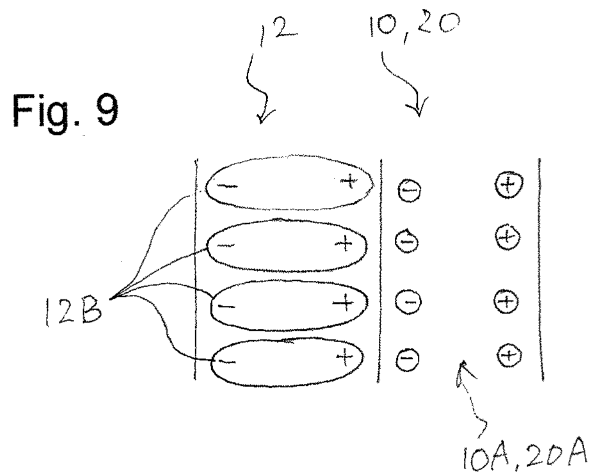
FIG. 9 is a schematic diagram showing an electric charge double layer according to an embodiment of the invention.

FIG. 9 shows forms an electric charge double layer 10A, 20A formed by the first or second conductor layer 10, 20, and ionic dipoles 12B formed by longitudinal optical mode.

Figure 10:
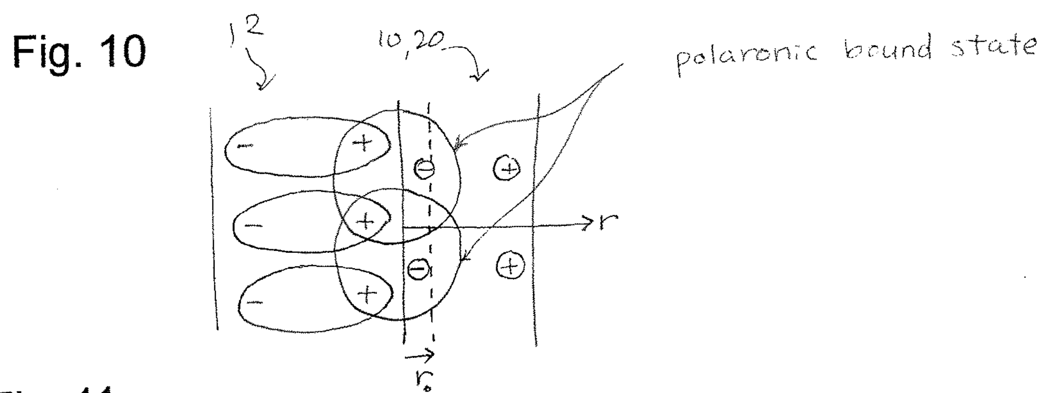
FIG. 10 is schematic diagram showing a coordinate system for the electric charge double layer of FIG. 9.
Figure 11:
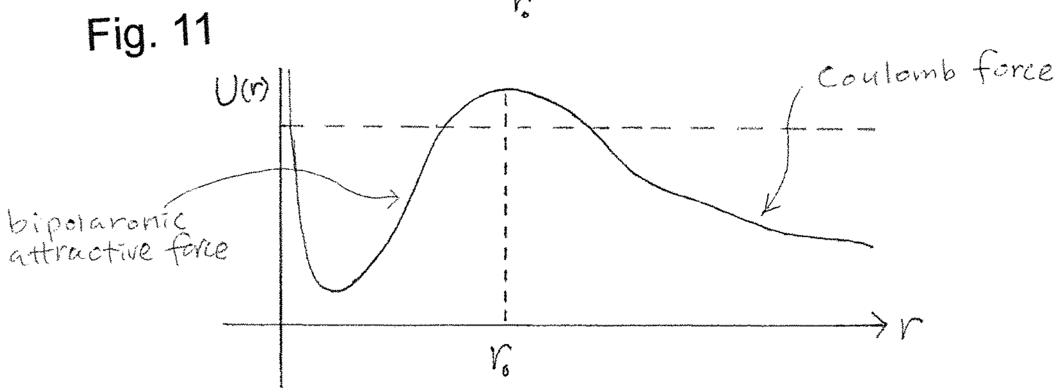
FIG. 11 is a graph of electric potential of the charge double layer according to an embodiment of the invention.

FIGS. 10 and 11 show an electric potential of the charge double layer, where r is a distance from the border between the conductor layer 10, 20 and the ionic or dipole material 12, and $r_o$ is a polaronic interaction range. In the range of $r<r_o$, the electric charges are bounded by polaronic interaction and Coulomb interaction of excitons. The bipolaronic attractive force diminishes at $r\approx 0$.

Figure 12:
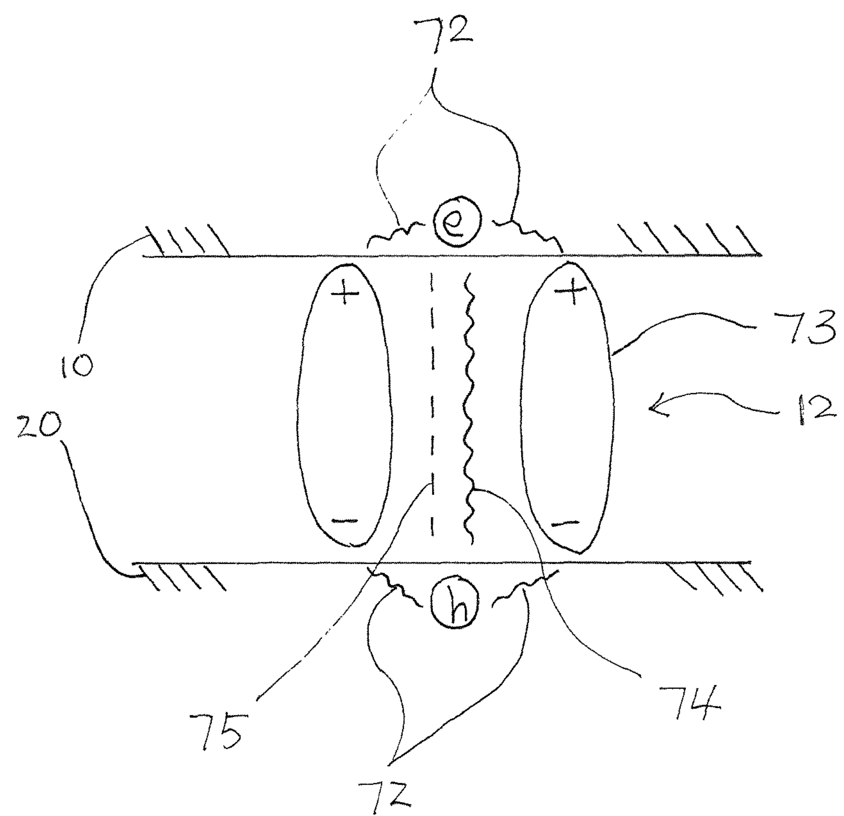
FIG. 12 is a schematic diagram showing an electron-hole bound state according to an embodiment of the invention.

FIG. 12 shows an electron-hole bound state among the first and second conductor layers 10, 20 and the ionic or dipole materials 12. The electron, the hole, and the ions are interacting with one another through a bipolaronic bound state 72, 74, electron-hole interaction 73 through polaronic optical mode, and a Coulomb interaction 75. The electron charge is localized at the pseudo-quantum well due to bipolaronic interaction potential.

The present invention provides a revolutionary novel electric energy storage cell whose electrical energy capacity is approximately more than 10 MWh/Kg. This breakthrough shows promise to resolve current energy crisis and global worming problems.

The novel electric energy storage device develops a capacitance by a mechanism entirely different from the mechanism of other ionic battery or other electrochemical battery or other kind of super capacitor using activated carbon and electrolytes.

The battery cell comprises a pair of electrodes and the conductor multilayers. The conductor layers are coated with ionic materials or dipole materials with which cover the entire layer surface. The two dimensional thin conductor layers coated with ionic or dipole materials are piled up together to form a 2+1 dimensional structure which is a layer stacking. The distance between the bilayers and the thickness of conductor layer should be a nano-size to introduce a pseudo-quantum well heterostructure which may be grown by molecular beam epitaxy and metal-organic chemical vapor deposition. Both techniques can control a layer thickness close to one atomic layer.

The multilayer structure is an insulator in the direction perpendicular to the layer surface. When DC voltage is applied perpendicular to the layer surface, the electrostatic potential between the positive electrode and the negative electrode can be in the form of dipole expansion in the ionic insulator materials.

On the conductor layer attached to the electrode, the charge carriers are built up by the interaction with ionic polarizations which are sandwiched between the bilayers. In turn, the ion polarizations induce charge polarization accompanied inside nearby conductor layer. It is a charge double layer in the conductor layer. So the electric energy supplied by both the positive and the negative electrode is transferred and stored in the cell in the form of binding energy.

The interaction of the longitudinal mode of ionic dipole wave and the electric charge is attractive to form a polaron. The interaction between the positive polaron and the negative polaron is an interaction between the electron and the hole mediated by longitudinal optical mode of ionic dipole wave. The combination of a polaron mediated interaction and Coulomb interaction causes the electrons and the holes form the indirect excitons between the bilayers. The excitons between the bilayers are stable because spatial separation of the electron and the hole and polaron interaction.

An exciton has a dipole moment. The interaction between an exciton and nearby ionic dipole is a dipole-dipole interaction. The interaction between the dipoles of the same direction is repulsive, but the interaction between the dipoles of the opposite direction is attractive. The dynamics of the dipoles of excitons and ions creates an pseudo antiferroelectric nanostructure. The electric energy delivered to the system is stored in the nano structure. The electric energy can be stored more than 10 MWH/Kg in this sample, so the battery capacity increased drastically compared to a conventional battery.

In a macroscopic view, the excitons and ionic dipoles are electrically neutral, so the system is macroscopically neutral and it can help a charging process. For a discharging process, AC voltage in the frequency range between 10 Hz to microwave frequency or higher frequency is used as a trigger power. In this case the battery cell acts as a capacitor in response to AC input power. The input power is set to be tuned with macroscopic dipole wave which is a constructive assembly of the dipole wave of the microstructures. Each microstructure is a micro-power source for discharge process.

The present invention used activated carbons and electrically polarizable ionic materials, and may use graphenes, carbon nanotubes, or any kind of conducting materials that are nano-sized and suitable to get doped with an ionic material for a conductor layer, ionic polymers and ionic minerals (dipole compounds).

Introduction

The current energy crisis and environmental problem require revolutionary energy storage system. The development of electric vehicle and portable electronic devices demands to develop a rechargeable battery of very high capacity. To meet these demands, it is required to develop a novel rechargeable battery whose capacity is extremely high way beyond conventional battery.

A conventional rechargeable battery has an intrinsic limitation in its capacity. The function to store electric energy is usually based on electrochemical reaction and ion transport. It is necessary to find out totally different and revolutionary way in storing electric energy.

With respect to a density of the system, a high capacity means a high electric energy density and a high electronic charge density. A nano-sized bound state of charges is introduced, The interaction among the comprising elements is strong in a nanostructure so that the electric energy density in the structure becomes very high. An electronic structure to meet the above requirements may reduce to a nano-size.

The conductor layers are two dimensional nano-sized thin layers.

The thin conductor layer are coated with ionic materials which cover the entire surface.

The coated conductor layers are stacked one by one to construct a 2+1 dimensional structure. The distance between the bilayers is nano-sized.

The ionic materials are coated on the surface of the conductor thin layer. The electric charge transport properties of these ionic materials are extremely low in the direction perpendicular to the surface. So those are an insulator but positive and negative ions are easily separable and polarizable when a voltage is applied, which is in contrast with an electrolytes for Li-ion battery, super-capacitor, which has an ion transport property of electrolytes.

A nano-sized bound state of the charges is created, which is induced by a charge separation and a longitudinal optical mode of dipolar phonon.

Most rechargeable batteries utilize an ion transport and a electrochemical reaction. In contrast, a ultracapacitor utilize an ion transport and a charge double layer to enhance a capacity. Both methods have an intrinsic limitation for higher capacity.

The liquid type ions are coated on the 2 dimensional carbon surfaces. The structure of the volume is 2+1 dimensional, and the layers of 2 dimensional surfaces piled up with one conductor layer and one ionic material layer in turn so that it becomes an insulator in the perpendicular direction to the surface.

The battery cell is composed of a pair of electrodes and the conductor bilayers sandwiched between them. The conductor layers are coated with ionic materials or dipole materials with which cover the entire layer surface and sandwiched between the bilayers. The two dimensional thin conductor layers coated with ionic or dipole materials are piled up together to construct a 2+1 dimensional structure which is a layer stacking. The distance between the bilayers and the thickness of conductor layer should be a nano-sized to introduce a pseudo-quantum well heterostructure which may be grown by molecular beam epitaxy and metal-organic chemical vapor deposition. Both techniques can control a layer thickness close to one atomic layer.

The present sample is made of an activated carbon powder. The activated carbon powder is mixed and coated with liquid ions. The carbon powder mixture is pressed to obtain the bilayers which are transformed from the carbon pores.

Charge Mechanism

When DC voltage is applied perpendicular to the layer surface, the electrostatic potential between the positive electrode and the negative electrode can be expressed in the form of dipolar expansion in the ionic insulator materials. A static longitudinal dipolar wave accumulates charges at the node and anti node in the direction perpendicular to the layer surface.

The charge carriers are built up at the surface of the conductor layers by the electric power supplied through the electrodes.

The electric charge built-up causes an ion polarizations which are sandwiched between the bilayers. In turn, the ion polarizations cause the electronic band structure tilted and the charge separation between the electrons and the holes accompanied inside the nearby conductor layer. It is consisted of a charge double layer inside the conductor layer. So the electric energy supplied by both the positive and the negative electrodes is transferred and stored in the cell in the form of binding energy.

DC electric power is applied in the direction perpendicular to the layer surface.

The electric charges are built up through the electrodes on the conductor layer which is attached to the electrode.

The ions between the bilayers are polarized due to the electric charge built up on the surface of the conductor layer.

The polarized ions are two dimensional dipole sheet. It creates a strong dipolar electric field on the surface of the nearby conductor layer in the multilayer system.

The dipolar electric field due to this ionic dipolar sheet sandwiched between the bilayers causes the electric charges of the thin conductor layer separated into the electrons and the holes.

The separated electronic charges comprise an electronic charge double layer inside the thin conductor layer.

The density of the ionic materials which are coated on the surface of the conductor layer may be low enough.

The ionic materials coated on the surface of the conductor thin layers and sandwiched between the bilayers are polarized and lined up along with the external DC field.

The polarized ion dipoles forms a ferroelectric array between the bilayers because an ionic dipole-dipole interaction is repulsive. For sufficiently low densities and two dimensional bilayer structure, the ions which are polarized between the bilayers are arranged to form the stable dipole solid.

If charges are introduced to the ferroelectric system, polarons are formed due to longitudinal optical phonons.

By the bipolaronic attractive interaction, the electrons and the holes are localized at the boundary of the bilayers. This interaction is caused by a longitudinal optical mode.

The electron is confined in one quantum well and the hole is confined in the other quantum well.

The interaction of the electron and the hole in the quantum wells is attractive, which is mediated by longitudinal optical mode of ionic dipole wave and Coulomb force.

The interaction between the electron and the hole between the bilayers is due to the interaction between the positive polaron and the negative polaron. The indirect excitons are created by the bipolarnic interaction and Coulomb attractive interaction of the electrons and the holes between the bilayers, which is a bound state of the electron and the hole.

The indirect excitons located in spatially separated quantum well heterostructure are stable due to the spatial separation of the bilayers and polaronic bound state at the layer surface The indirect exciton that is a bound state of the electron and the hole has a dipole moment.

In the case of low density excitons, the interaction between the excitons and the ionic dipoles may be translated into a dipole-dipole interaction.

The interaction between the dipoles of the same direction is a repulsive force. On the other hand, the interaction between the dipoles of the opposite direction is an attractive force.

The revolutionary way to enhance a battery capacity may be to create a nanostructure comprised of the electronic charges and the ions combined together, which is a stable antiferroelectric nanostructure. This nanostructure is stable due to a dipole-dipole interaction between the excitons and the ionic dipoles. This nanostructure of the electric charges and ions are complex bound states of dipoles.

An electric energy is stored in the form of the antiferroelectric nanostructure between the bilayers and the electronic charge double layer inside the conductor layer.

The interaction between the excitons and the ionic dipoles create a collective phenomena to form an antiferroelectric nanostructure. This phenomenon makes the excitons remain stable. The stability of an exciton is very important for a storing energy in this nanostructure.

The binding energy in the case of atom is defined as the difference in energy between the collection of free atoms and the collection of these atoms to make a solid. Likewise the energy transferred to the system to create an antiferroelectric nanostructure is stored as a binding energy.

It is necessary for an external disturbance to break the bound states.

Discharge Mechanism

When the cell is charged, the electric charges and the ions are bound together to form a antiferroelectric nanostructure which is electrically neutral.

There is no apparent charge on the electrode. A voltaic power is not produced by itself.

AC power is applied to the cell as a trigger power for discharge. An antiferroelectric nanostructure and ionic dipole in the cell respond to the external AC power.

The electric charges which are stored inside a superstructure begins to get released in response to the applied external field.

The battery cell responds to an external AC power like a capacitor. It is defined by analogy with the macroscopic laws of electrodynamics. An external field is tuned with the dipole moments of the cell at around 25 KHz and 13 KHz which are depend on the sample.

At those resonance frequencies, the electric energy stored in the nanostructure is released well.

The electronic charges which is bound as excitons may get disturbed by the ionic dipolar field induced by external AC power, and the electric energy can be released.

A each antiferroelectric structure of the battery cell acts like micro-voltaic power source. Macroscopic electric power may be enhanced by the micro-voltaic power. Macroscopic output voltage is a sum of micro-voltages inside the cell.

In this case, the dispersion equation of AC field may be a complex.

EMBODIMENTS

When a DC voltage is applied in the direction perpendicular to the bilayers, the electric charges in the conductor layer are polarized and separated as the electrons and the holes, and the induced electric charges arise at the surface of the conductor layers. In turns, the ions may be polarized, which are sandwiched between the conductor bilayers. The ionic dipole moments are lined up with the external field in the direction perpendicular to the bilayer surface.

The electrostatic potential applied between the positive and the negative electrodes can be expressed in the form of an ionic dipole expansion for an insulator.

Electric Charge Double Layer

The polarized electronic charges comprise an electronic charge double layer inside the thin conductor layer. The electric energy which is transferred into the system is stored as an electric potential energy in the form of the electronic charge double layer. If the conductor layer is thin and wide enough, it is a thin dipole disk. The electric field due to this dipole disk is extremely high at the surface. It will cause the ions sandwiched between the layers to get polarized.

Ferroelectric Solid Array of the Ionic Dipole

The density of the ionic materials sandwiched between the conductor bilayers may be very low enough. The ionic dipoles can move only in a two dimensional plane. They are lined up along the external field. The ionic dipoles that are lined up in the same direction forms a ferroelectric nanostructure between the bilayers because an ionic dipole-dipole interaction is repulsive. For sufficiently low densities and two dimensional bilayer structure, the ionic dipoles which is lined up in the direction perpendicular to the surface of the layers are arranged to form the stable dipole solid. At the sufficiently low density the dipole-dipole interaction is a dominating influence on the behavior of the polarized ions. The ionic dipoles are sandwiched between the bilayers and can move only in the direction parallel to the two dimensional surface. In this case the potential energy keeps the dipoles apart due to the repulsive interaction and the kinetic energy is not sufficient enough to overcome the potential energy barrier, so the dipoles are localized at the fixed site. The ions of sufficiently low density which is sandwiched between the two dimensional bilayers favors formation of an ordered array of the ionic dipoles located between the conductor bilayers because the repulsive interaction between the polarized ions stabilizes an ionic dipole array. The ordered ionic dipole array is a ferroelectric structure.

Localized Polaron Interaction

The charges arised at the surface interact with longitudinal optical phonons of ionic dipoles. A longitudinal mode of optical phonon may attract electric charges, in turn the interaction also affect the equilibrium state of the polarized ions. Holstein described this phenomena as polarons. In the case of low density and two dimensional array, the polarons are localized due to the ferroelectric array of the ions, and the hetero structural quantum wells created by the ion polarization.

The conduction electron (or hole) may get localized into the state of the pseudo-quantum well due to the polaronic interaction. If the interaction of the negative polarons and the positive polarons is mediated by the longitudinal optical phonon between the bilayers, the excitons are created by the Coulomb interaction between the electrons and the holes.

A Creation of an Antiferroelectric Nanostructure

The interaction of negative polarons and positive polarons turns into the interaction of the electrons and the holes between the bilayers. The excitons are created by Coulomb interaction and polaron mediated interaction between the bilayers. The spatial separation of the electron and hole which are between the conductor bilayers is nano-sized to form excitons.

The indirect excitons have a dipole moment. The dipoles of the excitons are lined up along the layer surface in the direction to perpendicular to the layer surface. The direction of the excitonic dipoles is opposite to that of ionic dipoles. The dipoles of the excitons and the ionic dipoles are oriented in the direction perpendicular to the layers.

The interaction between the excitonic dipoles and ionic dipoles are attractive. A force between dipoles of the same direction is repulsive, but dipoles of opposite direction is attractive. The dynamics of the dipoles of excitons and ions creates an anti-ferroelectric nanostructure due to a dipole-dipole interaction. The electric energy delivered to the system is stored inside of a nanostructure.

Binding Energy of the Antiferroelectric Nanostructure

The antiferroelectric nanostructure is regarded as a composite system composed of the electrons and the holes and the ions. The aspect of the nanostructure is analogous to the application of nuclear physics. The electric charge double layer inside the conductor layer, there must be an attractive force between the electrons and the holes, the electrostatic force tends to pull the electrons and the holes close together. Hence, for a stable double layer system to exist, there must be a strong pulling force in the opposite direction to the force from the charge double layer. This strong polaronic binding force is due to longitudinal optical phonon and electrostatic force between the bilayers. This polaronic force is a short range force, and overcomes the Coulomb force of the double layer, which is a long range force. When an ion and an electronic charge get close at the surface they are bound together. So the transferred electric energy creates an antiferroelectric nanostructure and the electric energy is stored as binding energy.

In this case, the binding energy is always negative because energy can be released when the nano structure is dismantled.

The antiferroelectric nanostructure is stabilized by the exchange interaction between the adjacent dipoles. The excitonic dipolar bosons and ionic dipolar bosons are coupled each other due to dipole exchange interaction, and can be transformed into diagonalized form of the interacting Hamiltonian so the interaction disappears between the excitonic bosons and the ionic bosons. It means that the nanostructure is stable.

The electric energy can be stored approximately more than 10 MWH/kg in this sample, so the battery capacity increased drastically compared to a conventional battery.

The formation of nanoparticle structure with the aim of storing electric energy and creating a novel metamaterial, can provide unique collective properties of antiferroelectricity.

Antiferroelectric nanostructures are of physical importance for energy storage devices. The antiferroelectric structures possess antiparallel-oriented electric dipoles and, as a result, no macroscopic polarization can arise.

By the analogy of the nuclear fission, the electric charges may be released from the antiferroelectric binding structure if the excitonic dipoles are excited by the ionic dipole disturbance, so also energy is set free in the process.

(1) The collective mechanism of the dipole systems can be explained in analogy with anti-ferromagnetic systems.

(2) The longitudinal optical phonon wave propagates inside the sample, so that the electric energy can be stored inside the sample in three dimensional volume, so it can enormously boost the capacity of the battery cell.

(3) A capacitor has a limitation of charging power due to surface charges because of repulsive force between like-charges. A chemical battery also has a same limitation. But the breakthrough of this novel type battery has achieved by the capability to store electric energy in the volume not on the surface and a neutrality of the nanostructure which cuts down the repulsive electric force between the like-charges.

In summary, energy crisis and global warming problem demand a solution by developing a novel energy storage device which has an extremely large capacity.

The demand for novel battery is that its capacity is way beyond conventional battery.

The manufacturing cost for the battery should be much lower than conventional battery for mass production. The materials composing this novel battery should be abundant on earth.

The novel battery must meet the conditions for a convenient and secure e-products and electric vehicle.

It is difficult for battery researches to scale up the battery capacity in the conventional methods to meet the demands.

The present invention is related to electrical energy storage systems which is rechargeable over numerous cycles to provide reliable power sources for a wide range of electrical devices.

It is an object of this invention to provide an energy storage device having extended energy storage capacity over those previously unknown and novel methods. The main principle is to create an antiferroelectric nanostructure between the bilayers and the electric double layer inside the conductor layers. The electric energy delivered to the system is stored in the antiferroelectric nanostructure as a binding energy.

The battery sample was made of an activated carbon powder and liquid ions. It may be useful for semiconductor technologies to construct a multilayer sample. But it is possible for the case of using activated carbon to obtain same results.

Activated carbon powder and liquid ions are mixed together, so liquid ions get adsorbed into the micro pores of the activated carbon. The average diameter of the micro pores is a nano-size of 1 to 2 nm.

After the carbon mixtures are dried out, it is pressed until the pore diameter is squeezed as a form of bilayer to the size at which the excitons begin to get created between the bilayers. The pressed carbon mixtures are 2+1 dimensional layer stack.

To prevent direct current, thin insulator plastic film is used to separate the positive and the negative electrodes.

The positive and the negative electrodes are attached to the multilayer surface parallel to the layers to fabricate the cell.

The composite battery cell may be manufactured as follows.

A storage system at least one dissociable salt is selected from the ionic material group consisting of $MgSO_4$, $LiPF_6$, $LiClO_4$, $LiN(CF_3SO_2)_2$, $LiBF_4$, $LiCF_3SO_3$, $LiSbF_6$, $Li_4Ti_5O_{12}$, etc. any kind of ionic mineral materials and dipole materials.

The material is selected from the group of open structured activated carbon powder, carbon nano tube, graphene.

For this sample, the material is selected from the group consisting of high surface area activated carbon powder.

The liquid ions are adsorbed into the pores of the activated carbons and coated on the surfaces of the pores.

$MgSO_4$ was selected as an ionic materials and mixed with oils to produce liquid ions.

The present invention relates to fabrication methods for activated carbon based rechargeable electric energy storage. More particularly, the present invention relates to a novel method to develop a battery of a huge capacity.

Figure 13:
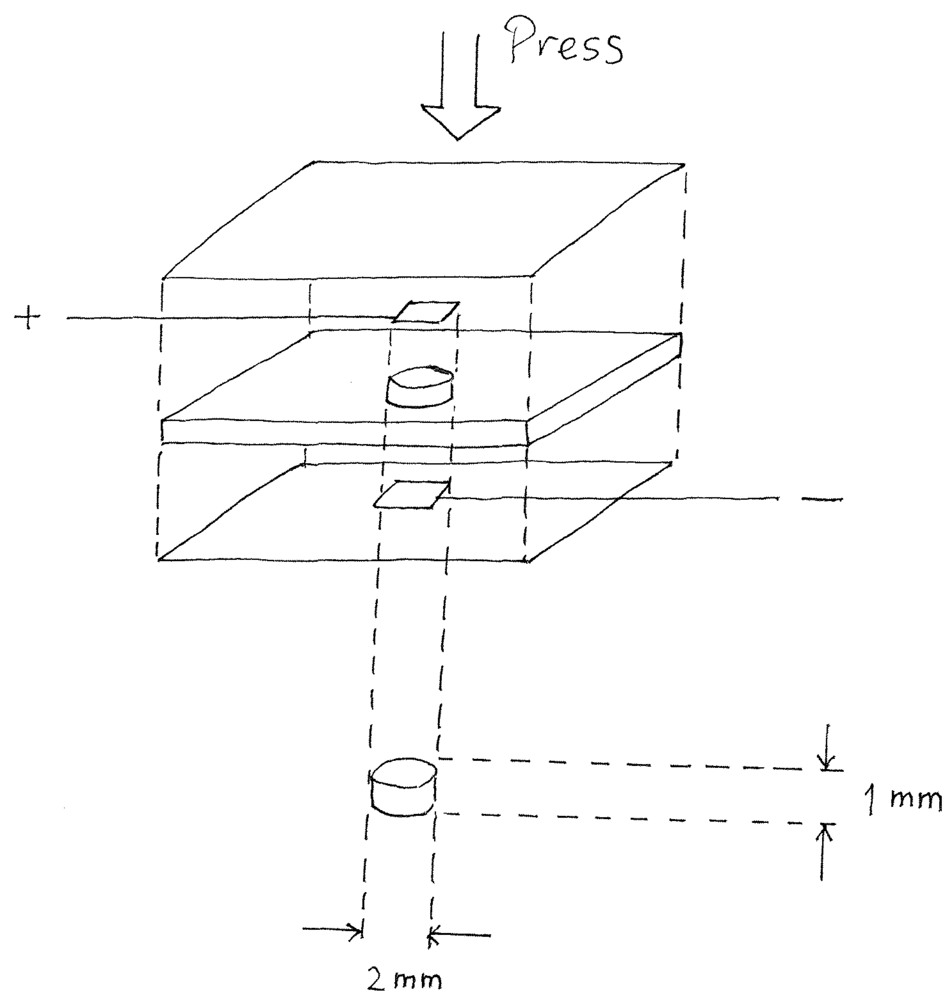
FIG. 13 is a schematic diagram showing how to obtain a multilayer structure according to an embodiment of the invention.

FIG. 13 shows how to obtain a multilayer structure according to an embodiment of the invention. The weight of the sample is about 0.01 g, and the diameter is about 2 mm, and the thickness is about 1 mm.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An electric energy storage device comprising:

a first conductor layer in a multilayer structure, both surfaces of which comprising a first ionic or dipole material layer immediately adjacent to the entire surface thereof and being insulated electrically;

a second conductor layer in the multilayer structure, both surfaces of which comprising a second ionic or dipole material layer immediately adjacent to the entire surface thereof and being insulated electrically;

wherein, the ionic or dipole material layers comprises an ionic or dipole material selected from the group consisting of $MgSO_4$, $LiClO_4$, $LiN(CF_3SO_2)_2$, $LiBF_4$, $LiCF_3SO_3$, $LiSbF_6$, and $Li_4Ti_5O_{12}$, a positive electrode attached only to a first layer of the first conductor layer of the multilayer structure;

a negative electrode attached only to a last layer of the second conductor layer of the multilayer structure, wherein the conductor layers are stacked between the first and last layers with a nanometer-scale interval therebetween so as to form the multilayer structure and at the same time a quantum well heterostructure with ionic polarization, wherein the first and second conductor layers inbetween the ionic or dipole material layers are sandwiched form bilayers configured to store electrical energy in the bilayers in a form of binding energy, wherein the electrical energy is stored in the first and second conductor layers and between the bilayers by applying a DC voltage in a direction perpendicular to the surface of the conductor layers to the positive and negative electrodes, and wherein the stored electrical energy is discharged and output to the first and second electrodes by using an external AC field in a predetermined frequency range a as guiding wave with trigger power.

2. The electric energy storage device of claim 1, wherein each of the first and second conductor layers includes activated carbons, electrically polarizable ionic materials, graphenes, carbon nanotubes, or any kind of conducting materials that are nanometer-scale in order to make a polaron interaction effective and suitable to get doped with an ionic material for a conductor layer, ionic polymers, and ionic minerals.

3. The electric energy storage device of claim 1, wherein each of the first and second conductor layers is two-dimensional with a nanometer-scale thickness.

4. The electric energy storage device of claim 1, wherein the first and second conductor layers are stacked on top of each other so as to form a 2+1 dimension to make a dipole-dipole interaction of the excitonic dipoles and ionic dipoles available for charging and discharging process, and wherein each of the first and second conductor layers is 2-dimensional.

5. The electric energy storage device of claim 1, wherein the ionic or dipole material layers of the first and second conductor layers have a substantially zero electric charge transport property in a direction perpendicular to a plane of the first or second conductor layer so as to be an insulator in that direction.

6. The electric energy storage device of claim 1, wherein a nanometer-sized bound state of charge is induced and created by a charge separation and a longitudinal optical mode of dipolar phonon between the first and second conductor layers, wherein a positive polaron and a negative polaron are formed in the bilayer, and wherein the bound states of electrons and holes are due to bipolaronic interaction and Coulomb force.

7. The electric energy storage device of claim 1, wherein the electrical energy is stored in an antiferroelectric nanostructure in the bilayer and the electronic charge double layer inside the conductor layer.

8. The electric energy storage device of claim 7, wherein the frequency of the external AC field is tuned with the dipole moments of the electrical energy storage device for discharging, wherein the electrical energy is stored inside the electric energy storage device in three dimensional volume.

9. The electric energy storage device of claim 8, wherein the antiferroelectric nanostructure functions as a microvoltaic power source when electrons and holes are released from the bound states in discharging, wherein a neutrality of the nanostructure helps a charging process, and wherein the output voltage is a sum of the micro-voltages.

10. The electric energy storage device of claim 1, wherein each of the first and second conductor layers is made from one selected from the group consisting of open structured activated carbon powder, carbon nano tube, and graphene.

11. The electric energy storage device of claim 10, wherein each of the first and second conductor layers is made from high surface area activated carbon powder.

12. The electric energy storage device of claim 10, wherein the ionic or dipole material is MgSO4.

13. The electric energy storage device of claim 1, wherein the first and second conductor layers are formed by pressing activated carbon mixtures with liquid ionic materials until a pore diameter is squeezed as a form of bilayer to the nano-size in the multilayer structure.

14. The electric energy storage device of claim 13, wherein the multilayer structure has a shape of a disc having about 1 mm thickness.

15. An electric energy storage system comprising an energy electric storage device of claim 8, comprising a first cell having the electric energy storage device and a second cell having another electric energy storage device, wherein the positive electrodes of the first cell and the second cell are connected to a first transformer and the negative electrodes of the positive electrodes of the first cell and the second cell are connected to a second transformer, so that an external AC field is input to the first and second cells through the first transformer and the output is provided through the second transformer, wherein the ionic dipole moments of the first cell and second cell are in a same direction with respect to the first and second transformers.

16. An electric energy storage system of claim 15, wherein the direction of the electric current between the two cells is forward and backward in turns according to the external AC field, such that two cells act like two charged capacitors connected in series.

* * * * *